United States Patent [19]
Kuo

[11] Patent Number: 5,946,781
[45] Date of Patent: Sep. 7, 1999

[54] MULTI-LAYER PACKAGING FOIL AND METHOD FOR MANUFACTURING THE FOIL

[76] Inventor: Weiwu A. Kuo, 7 Wickland, Irvine, Calif. 92720

[21] Appl. No.: 08/853,575

[22] Filed: May 9, 1997

[51] Int. Cl.⁶ .............................. B21D 33/00; B32B 31/00
[52] U.S. Cl. ......................... 29/17.3; 29/469.5; 156/233; 156/277; 156/324
[58] Field of Search .................................. 29/17.1, 17.2, 29/17.3, 17.4, 469.5; 156/209, 233, 247, 308.2, 307.3, 324, 277

[56] References Cited

U.S. PATENT DOCUMENTS

| | | |
|---|---|---|
| 4,152,476 | 5/1979 | Stillman . |
| 4,908,285 | 3/1990 | Kushibiki et al. . |
| 4,971,646 | 11/1990 | Schell et al. . |
| 5,104,471 | 4/1992 | Antes et al. . |
| 5,149,386 | 9/1992 | Smits et al. . |
| 5,310,222 | 5/1994 | Chatwin et al. . |
| 5,310,436 | 5/1994 | Pricone et al. . |
| 5,383,687 | 1/1995 | Suess et al. . |
| 5,421,618 | 6/1995 | Okazaki et al. . |
| 5,517,336 | 5/1996 | Molee . |
| 5,656,360 | 8/1997 | Faykish et al. . |
| 5,658,411 | 8/1997 | Faykish . |
| 5,780,140 | 7/1998 | Nilsen . |
| 5,781,316 | 7/1998 | Strahl et al. . |

*Primary Examiner*—S. Thomas Hughes
*Assistant Examiner*—John Preta
*Attorney, Agent, or Firm*—W. Wayne Liauh

[57] ABSTRACT

A multi-layer packaging foil having a hologram membrane therein, includes a bottom structure made of plastic material and a top structure made of aluminum foil with a hologram membrane sandwiched therebetween. The hologram membrane is composed of a layer of resin and a thin layer of aluminum with a serration defining a hologram formed thereon so that when the packaging foil is viewed from the bottom structure side, a 3-D image is generated by the serration. Also provided herein is a method for manufacturing the multi-layer packaging foil, including the steps of applying a resin layer on a plastic bottom structure with a thin layer of aluminum covered thereon, forming a serration defining a hologram on the aluminum and resin layers by means of a serration forming roller and adhesively attaching a top structure which comprises an aluminum foil over the serration.

14 Claims, 12 Drawing Sheets

5,946,781

MULTI-LAYER PACKAGING FOIL AND METHOD FOR MANUFACTURING THE FOIL

FIELD OF THE INVENTION

The present invention relates to a packaging material sheet and in particular to a multi-layer packaging aluminum foil having a hologram layer therein. The present invention is also related to a method for manufacturing the packaging foil.

BACKGROUND OF THE INVENTION

Aluminum foils have been widely used in packing products, such as pill, tablet and capsule medicine which is usually packed in a plastic container in the form of a thin plastic sheet with a number of recesses thereon each receiving and containing a tablet or a pill. An aluminum foil is then adhered to the plastic sheet to cover and seal the recesses and thus secures the medicine therein. Other products, such as cookies, jelly, cosmetics and candies, are also commonly packed with packaging material comprised of aluminum foils. Another product that is commonly packed with aluminum foil based packaging material is liquid product, such as milk, juice and soda water. Also, plastic oil containers are commonly sealed by providing an aluminum foil on the container opening. Most of the packaging or sealing material is provided with commercial marks or user's instructions for advertisement or use or operation instruction. For the packaging material that is comprised of aluminum foil, the advertisement and/or instruction is provided by regular printing technique. Counterfeit of such printed packaging material is, obviously, quite easy.

Thus, it is desirable to provide a multi-layer packaging foil comprises a hologram layer therein which not only provides a more attractive appearance of a product packed thereby due to the 3-D image provided by the hologram and is also effective in preventing counterfeit due to the difficult in imitation of hologram.

OBJECTS OF THE INVENTION

Therefore, an object of the present invention is to provide a multi-layer packaging foil which comprises a hologram layer so as to enhance the effectiveness of anti-counterfeit of the product packed or sealed by the packaging foil.

Another object of the present invention is to provide a multi-layer packaging foil which comprises a hologram layer therein for the generation of a 3-D image for better attraction to the consumers.

A further object of the present invention is to provide a low cost anti-counterfeit packaging material comprising a hologram layer which may be formed in-expensively so that an economic anti-counterfeit may be achieved on the products packed by the packaging material.

To achieve the above and other objects, there is provided a multi-layer packaging foil comprising a bottom structure made of plastic material and a top structure made of aluminum foil with a hologram membrane sandwiched therebetween. The hologram membrane is composed of a layer of resin and a thin layer of aluminum with a serration defining a hologram formed thereon so that when the packaging foil is viewed from the bottom structure side, a 3-D image is generated by the serration. A method for manufacturing the multi-layer packaging foil is also provided, comprising the steps of applying a resin layer on a plastic bottom structure with a thin layer of aluminum covered thereon, forming a serration defining a hologram on the aluminum and resin layers by means of a serration forming roller and adhesively attaching a top structure which comprises an aluminum foil over the serration.

BRIEF DESCRIPTION OF THE DRAWINGS

The present invention will be better understood from the following description of preferred embodiments thereof, which are illustrative and not limitative, with reference to the attached drawings, wherein.

DETAILED DESCRIPTION OF THE PREFERRED EMBODIMENTS

Figure 1:
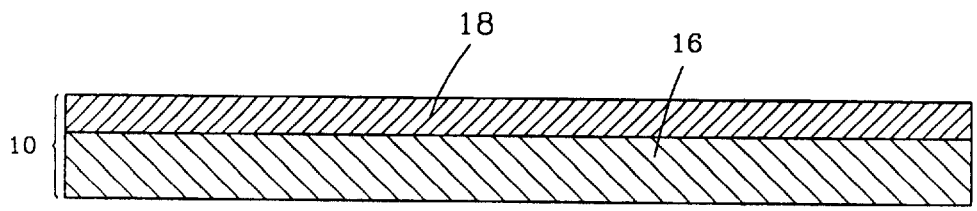
FIG. 1 is a cross-sectional view showing a bottom structure of a multi-layer packaging foil constructed in accordance with a first embodiment of the present invention.
Figure 2:
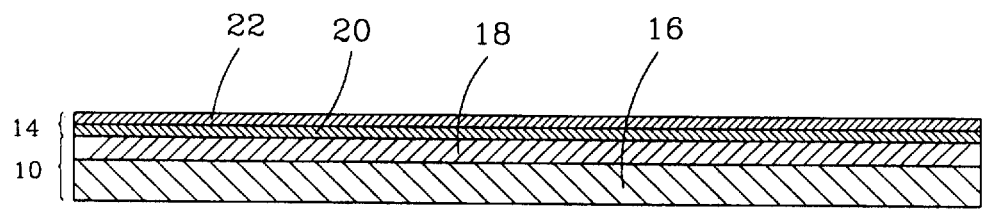
FIG. 2 is a cross-sectional view of the bottom structure of the first embodiment of the present invention with a hologram membrane provided thereon, serration defining a hologram being not yet formed on the hologram membrane.

With reference to the drawings and in particular to FIGS. 1–6, which show a multi-layer packaging foil constructed in accordance with a first embodiment of the present invention at different steps of manufacturing process, the multi-layer packaging foil in accordance with the present invention comprises a bottom structure 10 and a top structure 12 with a hologram membrane 14 sandwiched therebetween. In the first embodiment of the present invention, the bottom structure 10 comprises a layer of plastic material 16 (referred to as base layer hereinafter) which has a suitable thickness. The plastic material that makes the base layer 16 may be for example polyethylene terephthalate (PET) or polyvinyl chloride (PVC) or other suitable material on which a layer of resin-based release 18 is coated (FIG. 1) for peeling purpose. The hologram membrane 14 is mounted on the release layer 18, comprising a primer layer 20 made of resin material on which a aluminum reflective layer 22 (FIG. 2) is provided. A serration which defines the hologram is then formed on the hologram membrane 14 by means of a serration forming roller 24 (FIG. 3) which is provided, on an outer surface thereof, with a pattern complementary to the serration defining the hologram so that when the serration forming roller 24 rolls over on the aluminum reflective layer 22, the hologram serration is formed. In this way, the hologram may be formed very economically.

Figure 3:
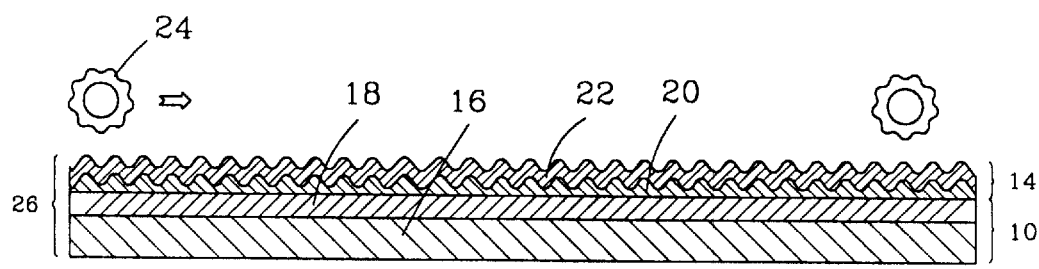
FIG. 3 is a cross-sectional view of the bottom structure of the first embodiment of the present invention with hologram serration formed on the hologram membrane.
Figure 5:
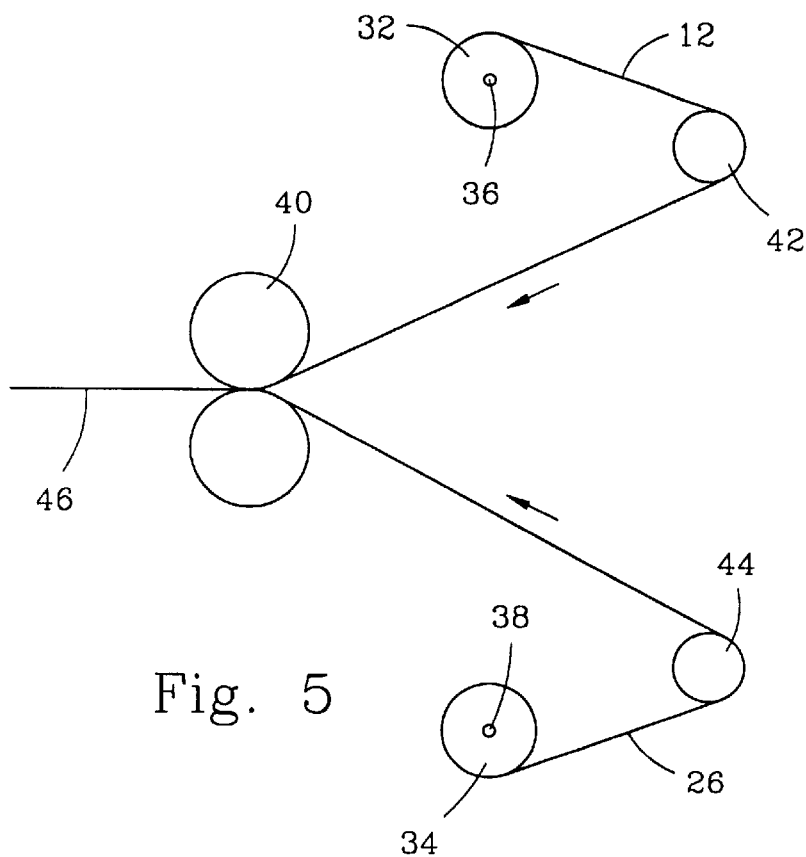
FIG. 5 is a schematic view showing the arrangement for combining the top structure to the bottom structure in accordance with the first embodiment of the present invention.

The bottom structure 10 with the hologram membrane 14 mounted thereon is in general a thin sheet like material, see FIG. 3, that may be wound around a reel as a roll for further processing as shown in FIG. 5. For simplifying the description herein, the bottom structure 10 with the hologram membrane 14 thereon will be referred to as lower half sheet and is generally designated with reference numeral 26.

Figure 4:
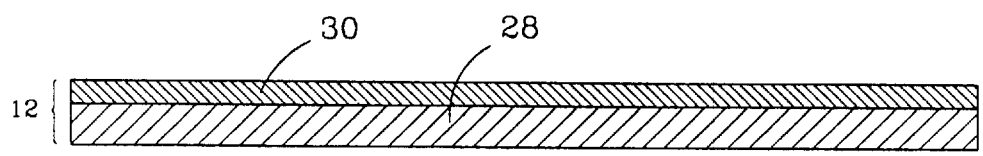
FIG. 4 is a cross-sectional view showing a top structure of the multi-layer packaging foil in accordance with the first embodiment of the present invention.

At the same when the lower half sheet 26 that is comprised of the bottom structure 10 and the hologram membrane 14 is formed, the top structure 12 as shown in FIG. 4 may be manufactured separately and independently. As shown in FIG. 4, the top structure 12 comprises an aluminum foil 28 on which a surface layer or adhesion layer 30 is provided. The surface layer or adhesion layer 30 is to serve as an inner lining which is in direction contact with product packed by the packaging foil of the present invention or to adhere to a portion of a packaging container that contains the product to be packed. The terms surface layer and adhesion layer will be interchangeably used hereinafter to represent the same layer or same component of the multi-layer packaging foil of the present invention. Further, the top structure 12 will also be referred to as upper half sheet as a counterpart to the lower half sheet 26. The upper half sheet 12 may also be wound around a reel as a roll for further processing, as shown in FIG. 5.

FIG. 5 illustrates the formation of the first embodiment multi-layer packaging foil with the upper half sheet 12 that is wound as a roll (referred to as upper sheet roll and designated at 32 herein) and the lower half sheet 26 that is also wound as a roll (referred to as lower sheet roll and designated at 34 herein). In accordance with the present invention, in manufacturing the multi-layer packaging foil of the present invention, the upper sheet roll 32 is rotatably fit over and supported on a first spindle 36 to allow the upper sheet roll 32 to rotate about the spindle 36 for un-winding the upper half sheet 12 from the upper sheet roll 32. Similarly, the lower sheet roll 34 is rotatably fit over and supported on a second spindle 38 that is spaced from the first spindle 36 to allow the lower sheet roll 34 to rotate about the second spindle 38 for unwinding the lower half sheet 26 from the lower sheet roll 34. The un-wound upper and lower half sheets 12 and 26 are then escorted to a pair of compression rollers 40 between which a gap having a predetermined size is present to allow the upper and lower half sheets 12 and 26 to simultaneously pass therethrough and to be properly compressed so as to have the upper and lower half sheets 12 and 26 attached to each other.

To have the upper and lower half sheets 12 and 26 secured to each other, an adhesive is provided therebetween before they pass through the roller pair 40. The adhesive may be a two component adhesive of which a first component is coated on the upper half sheet 12 and a second component on the lower half sheet 26 so that when they contact and mix with each other at the time the upper and lower half sheets 12 and 26 pass through between the compression rollers 40, they adhere the upper and lower half sheets 12 and 26 to each other. Preferably, each of the upper and lower half sheets 12 and 26 are guided to an idler 42 or 44 first before they are conducted to the compression rollers 40 and the two components of the adhesive may be applied to the upper and lower half sheets 12 and 26 at locations between the idlers 42 and 44 and the compression rollers 40.

Figure 6:
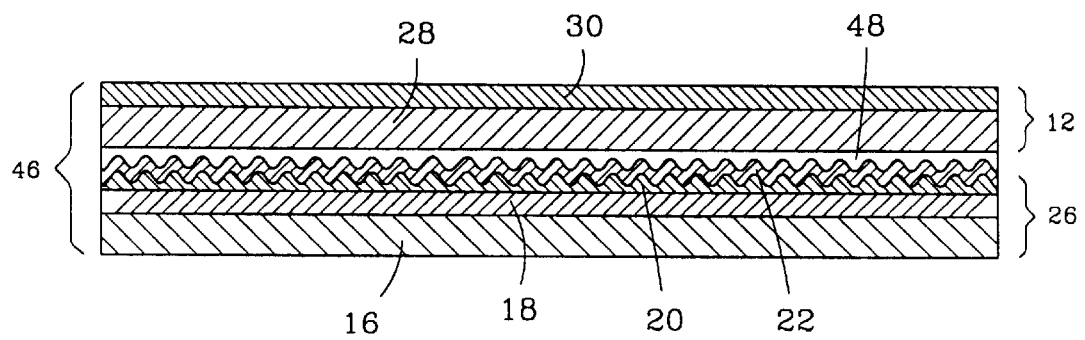
FIG. 6 is a cross-sectional view showing the multi-layer packaging foil in accordance with the first embodiment of the present invention.

In adhering the upper half sheet 12 to the lower half sheet 26, the aluminum foil 28 of the upper half sheet 12 is brought into contact engagement with the aluminum reflective layer 22 of the hologram membrane 14 which has the hologram serration formed thereon, as shown in FIG. 6 wherein reference numeral 46 indicates the multi-layer packaging foil so manufactured in accordance with the first embodiment of the present invention and reference numeral 48 which indicates a section between the upper half sheet 12 and the lower half sheet 26 is the adhesive that fixes the upper half sheet 12 to the lower half sheet 26. As shown in FIG. 6, the multi-layer packaging foil 46 in accordance with the first embodiment of the present invention comprises, from top to bottom, an adhesion layer (surface layer) 30, an aluminum foil 28, adhesive 48, an aluminum reflective layer 22, a primer layer 20, a release layer 18 and a base layer 16. The multi-layer packaging foil 46 so manufactured is preferably in the form of a long strip wound around a reel as a roll for further processing, which is designated at 50 in FIG. 7. Such a roll is very convenient for transportation to a further processing site.

Figure 7:
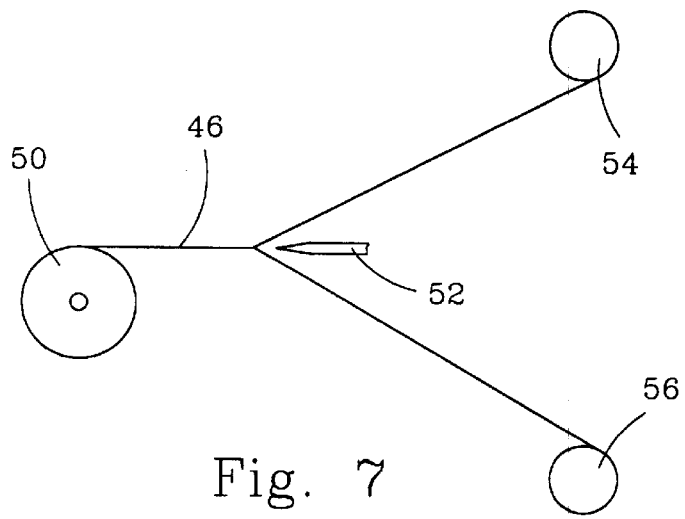
FIG. 7 is a schematic view showing the slitter arrangement for removing the bottom structure from the multi-layer packaging foil of FIG. 6.
Figure 8:
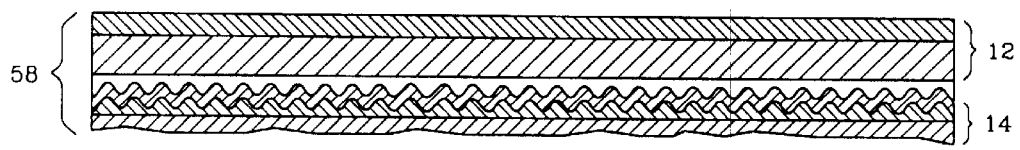
FIG. 8 is a cross-sectional view showing the multi-layer packaging foil with the bottom structure being removed by slitting operation for attaching to a container that contains a product to be packed thereby, such as a medicine container for separately and individually holding therein a plurality of for example tablets.
Figure 9:
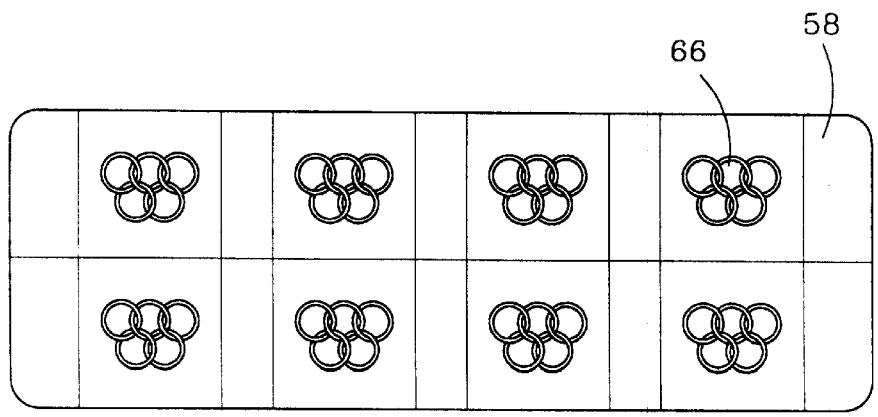
FIG. 9 is a top plan view schematically showing a 3-D image displayed on the outside surface of the packaging foil of the present invention when the packaging foil is used to seal the container that separately and individually holding therein a plurality of medicine tablets.

In using the multi-layer packaging foil 46 that is wound as a roll 50, an unwinding device (not shown) to un-wind the multi-layer packaging foil 46 from the roll 50 and the un-wound packaging foil 46 is then processed by a slitter 52, see FIG. 7, to have the bottom structure 10 detached from the multi-layer packaging foil 46 at the release layer 18. The two portions of the packaging foil that are separated from each other in the slitting operation are then wound as rolls, as indicated at 54 and 56. The multi-layer packaging foil with the bottom structure 10 detached therefrom is indicated at 58 in FIG. 8, generating a 3-D image when viewed from the outside, due to the provision of the hologram serration on the hologram membrane 14, as shown in FIG. 9. The packaging foil 58 so manufactured may then be used to pack for example medicine tablet or pill, as shown in FIG. 10.

Figure 10:
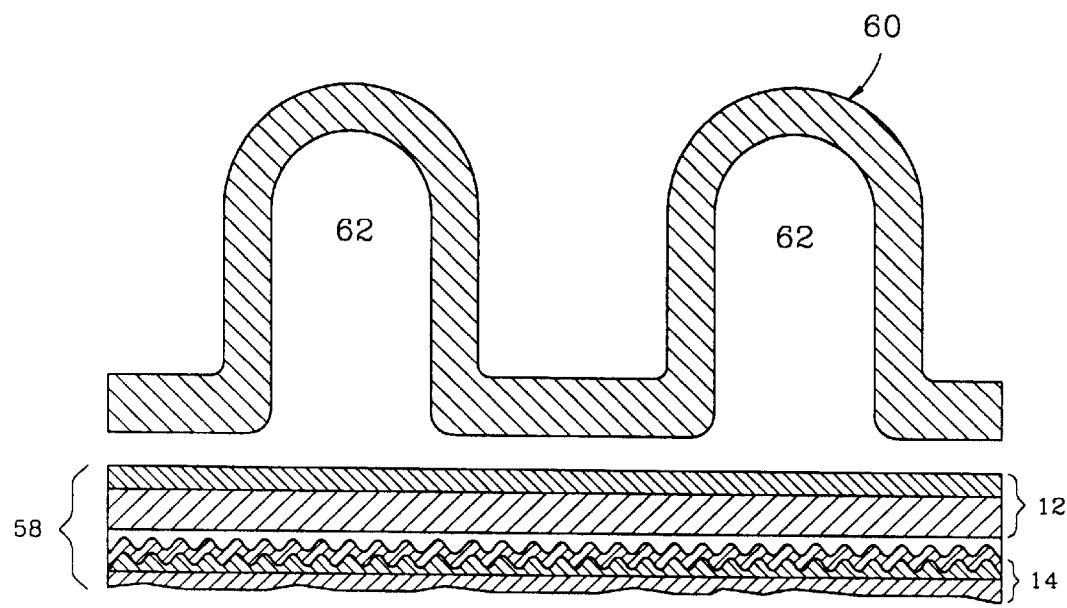
FIG. 10 is exploded cross-sectional view showing the multi-layer packaging foil in accordance with the first embodiment of the present invention is adapted to seal the medicine tablet container
Figure 11:
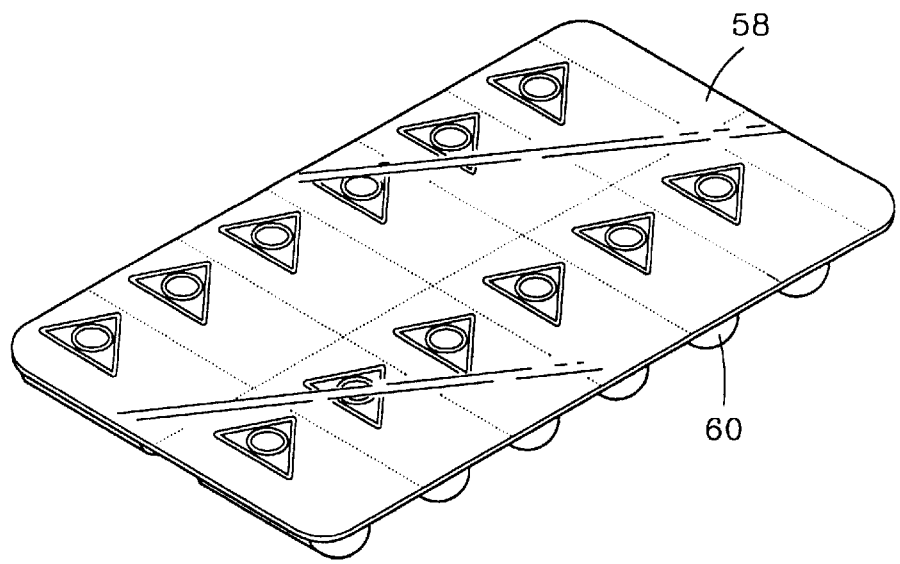
FIG. 11 is a perspective view showing the medicine tablet container sealed with the multi-layer packaging foil.

As shown in FIG. 10, a medicine package container, generally designated at 60, is made of plastics, such as polyvinyl chloride (PVC) having a number of recesses 62 formed thereon to each receive and hold therein a tablet or a pill (not shown) with the packaging foil 58 in accordance with the present invention attached thereto to seal the recesses 62. Attaching the packaging foil 58 to the medicine package container 60 is done by mounting the outer adhesion layer 30 of the top structure (or upper half sheet) 12 of the packaging foil 58 to the medicine package container 60 to have the openings of the recesses 62 completely covered by the packaging foil 58, as shown in FIG. 11 wherein the hologram serration provided on the packaging foil 58 displays a 3-D holographic image. In such an application, the packaging foil 58 of the present invention is attached to the medicine container 60 by applying heat thereto. The temperature rise caused by the heat that is used to seal the packaging foil 58 to the medicine package container 60 is not very remarkable so that no heat damage to the medicine packed inside the medicine package container 60 may be caused. Alternatively, sealing the packaging foil 58 to the medicine package container 60 by applying pressure thereto is also possible and under such a situation, the adhesion layer 30 has to have pressure sensitive adhesive provided thereon.

Further, if needed, patterns or marks may be printed on the separated release layer 18 and in this respect, the release layer 18 has to be a thermoplastic material on which regular printing technique may be adapted to perform the printing operation of the release layer 18. Thus, the packaging foil so formed may comprise two patterns, one of the patterns comprising the hologram serration for generation of the 3-D image and the other comprising the printed patterns.

In the first embodiment illustrated in FIGS. 1–11, the serration that defines the hologram is formed on the hologram membrane by having the aluminum reflective layer 22 coated on the primer layer 20 first and then using the serration forming roller 24 to roll over on the aluminum reflective layer 22. Alternatively, the serration may be directly formed on the primer layer 20 by means of the serration forming roller and then coating an uniform aluminum on the serrated primer layer to serve as the aluminum reflective layer. This is illustrated in a second embodiment shown in FIGS. 12–15.

Figure 12:
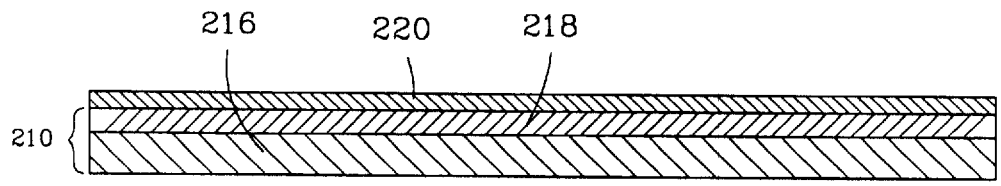
FIG. 12 is a cross-sectional view showing a bottom structure of a multi-layer packaging foil in accordance with a second embodiment of the present invention.
Figure 13:
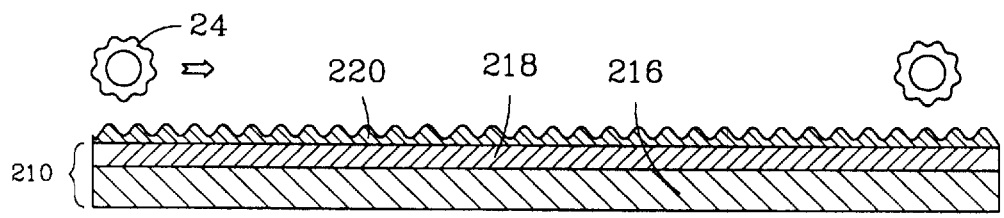
FIG. 13 is a cross-sectional view of the bottom structure of the second embodiment packaging foil with a primer layer of a hologram membrane mounted thereon.
Figure 14:
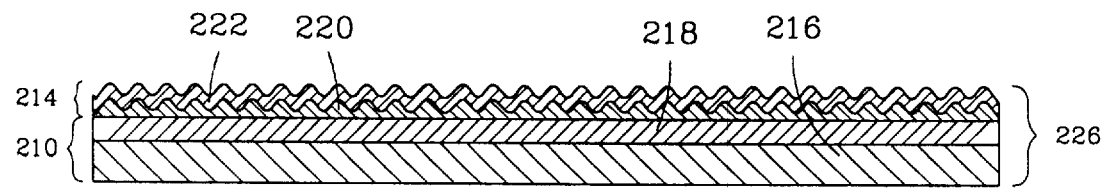
FIG. 14 is a cross-sectional view of the bottom structure of the second embodiment packaging foil with a thin and uniform aluminum layer coated on the primer layer of the hologram membrane.
Figure 15:
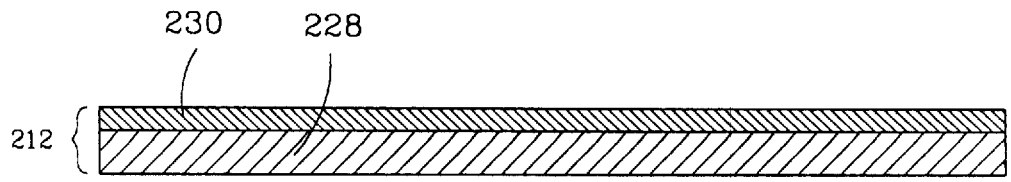
FIG. 15 is a cross-sectional view showing a top structure of the second embodiment packaging foil.

As shown in FIG. 12, the base layer 216 that is made of for example PET or PVC or similar material is first coated with a resin release layer 218 to define a bottom structure 210 of the second embodiment of the present invention on which a primer layer 220 of a hologram membrane 214 is attached. A serration forming roller 24 is then used to form a serration defining a hologram on the primer layer 220, as shown in FIG. 13. After the hologram serration is formed on the primer layer 220, an uniform aluminum layer 222 is coated on the serrated primer layer 220 by means of for example electroplating or vacuum deposition, as shown in FIG. 14 wherein the aluminum layer 222 and the primer layer 220 in combination define the hologram membrane 214 of the second embodiment of the present invention. The hologram membrane 214 and the bottom structure 210, together, define the lower half sheet 226 of the second embodiment of the present invention Further, the second embodiment packaging foil comprises an upper half sheet or top structure 212, as shown in FIG. 15, which, similar to the top structure 12 of the first embodiment shown in FIG. 4, comprises an aluminum foil 228 attached to an adhesion layer 230. In forming the packaging foil in accordance with the second embodiment, the manufacturing process is similar to that of the first embodiment. Namely, the upper half sheet 212 and the lower half sheet 226 are respectively wound as the upper sheet roll 32 and the lower sheet roll 34 (see FIG. 5) and then by making use of the arrangement shown in FIG. 5, the upper half sheet 212 and the lower half sheet 226 are escorted to a pair of compression rollers 40 which have a gap therebetween through which the upper and lower half sheets 212 and 226 move to be compressed thereby and thus adhered to each other. The adherence of the upper half sheet 212 to the lower half sheet 226 is done by bringing the aluminum foil 228 of the upper half sheet 212 into contact engagement with the aluminum reflective layer 222 of the lower half sheet 226 with an adhesive applied to both the aluminum foil 228 and the aluminum reflective layer 222 and having the so adhered upper and lower half sheets 212 and 226 securely fixed to each other by being compressed by the compression rollers 40 so as to form the structure shown in FIG. 6.

The first and second embodiments in accordance with the present invention are, in general, very similar to each other with the only difference being the sequence of coating the aluminum reflective layer and forming the hologram serration. The multi-layer packaging foils manufactured in accordance with the first and second embodiments have the same structure and may be used in the same way. Thus, no further detail is needed herein.

Figure 16:
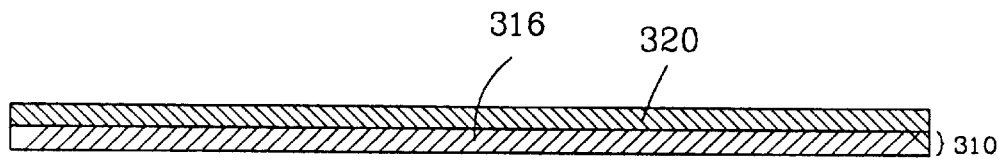
FIG. 16 is a cross-sectional view showing a bottom structure in accordance with a third embodiment of the present invention with a primer layer that constitutes a hologram membrane coated thereon.
Figure 17:
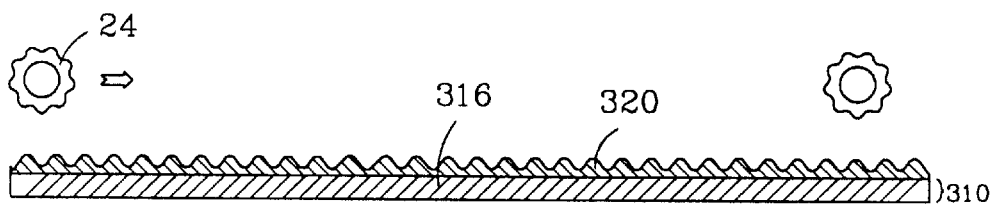
FIG. 17 is a cross-sectional view showing the formation of hologram serration on the primer layer that is provided on the bottom structure shown in FIG. 16.
Figure 18:
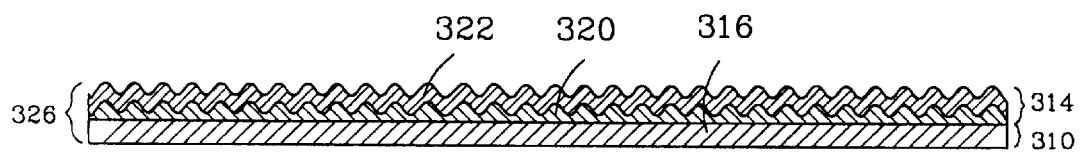
FIG. 18 is a cross-sectional view showing an aluminum reflective layer is added to the primer layer of the third embodiment of the present invention.

In the first and second embodiments described previously, the bottom structure 10 or 210 is made by coating a release layer 18 or 218 to the PET or PVC base layer 16 or 216. However, the release layer 18 may be eliminated and the resin material that comprises the primer layer of the hologram membrane is directly applied to the base layer of the bottom structure which will be further described hereinafter as a third embodiment constructed in accordance with the present invention and shown in FIGS. 16–19. In accordance with the third embodiment of the present invention, the multi-layer foil of the present invention comprises a bottom structure 310 which is constituted by a single base layer 316 without the release layer. The base layer 316 may be made of plastics, such as PET or PVC, with a layer of resin 320 coated thereon which serves as the primer layer of the hologram membrane 314, as shown in FIG. 16. Thereafter, similar to the second embodiment, a serration forming roller 24 is used to form serration that defines a hologram on the primer layer 320, as shown in FIG. 17. An uniform layer of aluminum 322 is then coated on the hologram serration by means of for example electro-plating or vacuum deposition to serve as the reflective layer of the hologram membrane 314 of the third embodiment. Thus, a lower half sheet 326 of the multi-layer packaging foil in accordance with the present invention is formed, as shown in FIG. 18.

Figure 19:
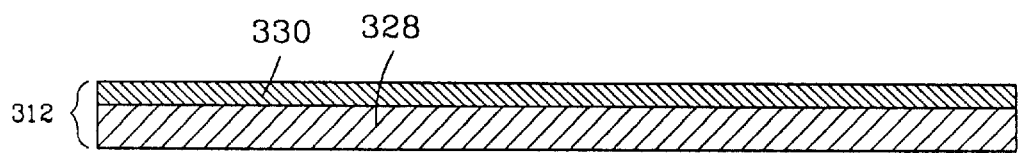
FIG. 19 is a cross-sectional view showing a top structure that is attached to the hologram serration shown in FIG. 18.

The third embodiment of the present invention also comprises an upper half sheet 312, as shown in FIG. 19, which is comprised of an aluminum foil 328 and an adhesion layer (surface layer) 330. The adhesion layer (surface layer) 330 may comprise pressure sensitive adhesive material or heat sensitive adhesive material.

Figure 20:
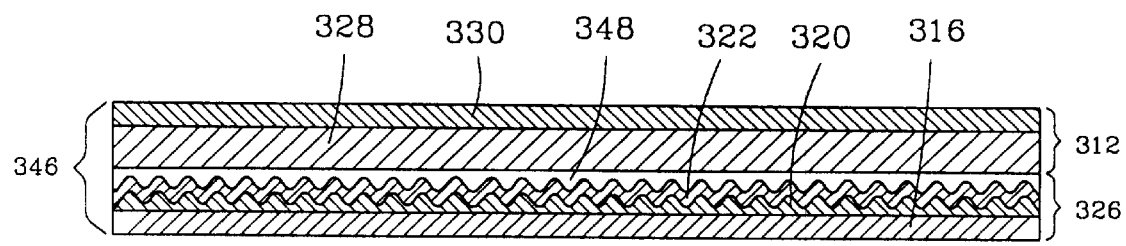
FIG. 20 is a cross-sectional view showing the multi-layer packaging foil in accordance with the third embodiment of the present invention.
Figure 21:
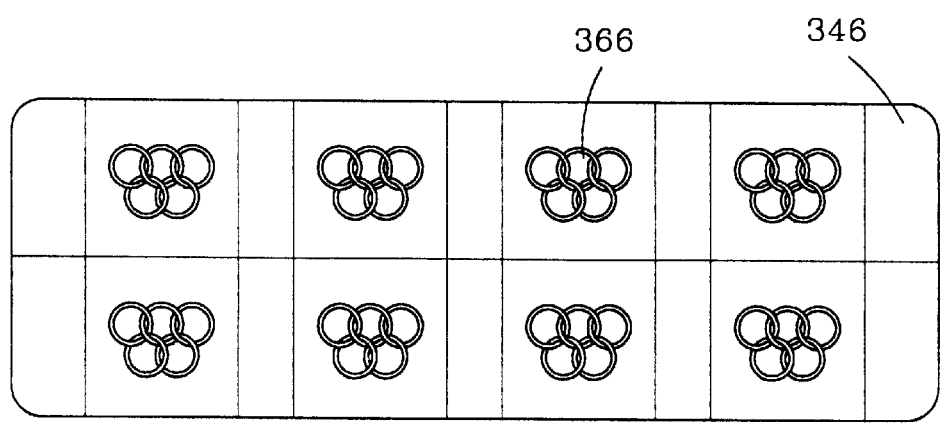
FIG. 21 is a top plan view showing a 3-D image displayed on the multi-layer packaging foil in accordance with the third embodiment of the present invention.

Similar to the first and second embodiment, in the third embodiment, the upper half sheet 312 and the lower half sheet 326 are fixed to each other by respectively applying the two components of the two component adhesive to the upper and lower half sheets 312 and 326, bringing them into contact engagement with each other and then passing the adhered upper and lower half sheets 312 and 326 through the gap between the compression rollers 40 (see FIG. 5) to have the upper and lower half sheets 312 and 326 compressed and securely attached to each other. This is identical to what illustrated in FIG. 5. The multi-layer packaging foil manufactured in accordance with the third embodiment of the present invention is shown in FIG. 20 and designated with reference numeral 346. In FIG. 20, reference numeral 348 indicates the adhesive constituted by the two component adhesive. The multi-layer packaging foil 346 so manufactured in accordance with the present invention displays a 3-D holographic image 366 re-constructed by the hologram serration when the packaging foil is viewed from the outside (bottom side in FIG. 20), see FIG. 21.

Figure 22:
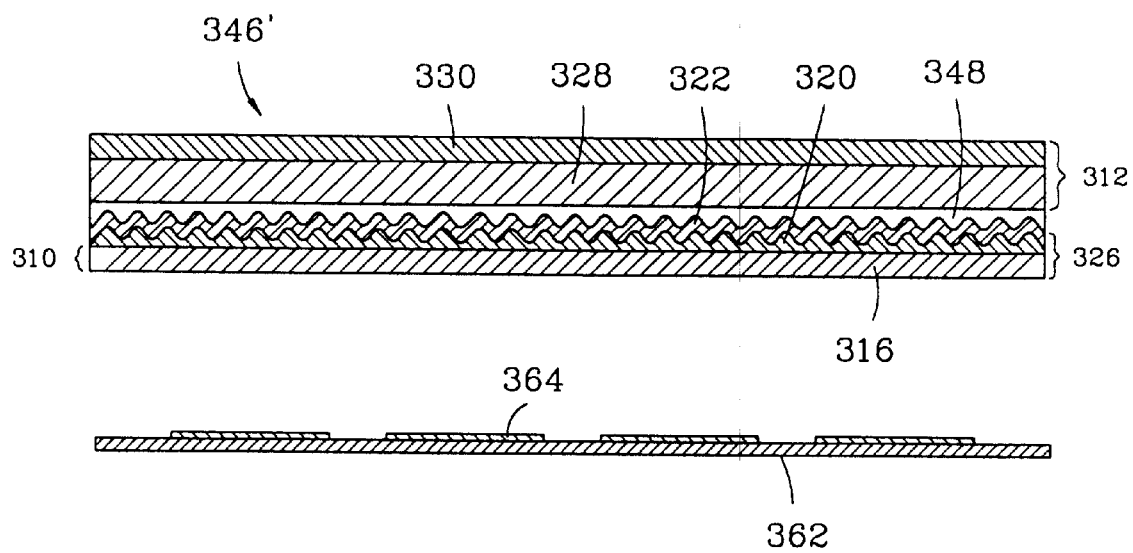
FIG. 22 is an exploded cross-sectional view showing a multi-layer packaging foil in accordance with a fourth embodiment of the present invention which comprises a layer of plastic material with patterned printed on an inside surface thereof to be attached to a bottom side of the bottom structure in accordance with the third embodiment of the present invention.
Figure 23:
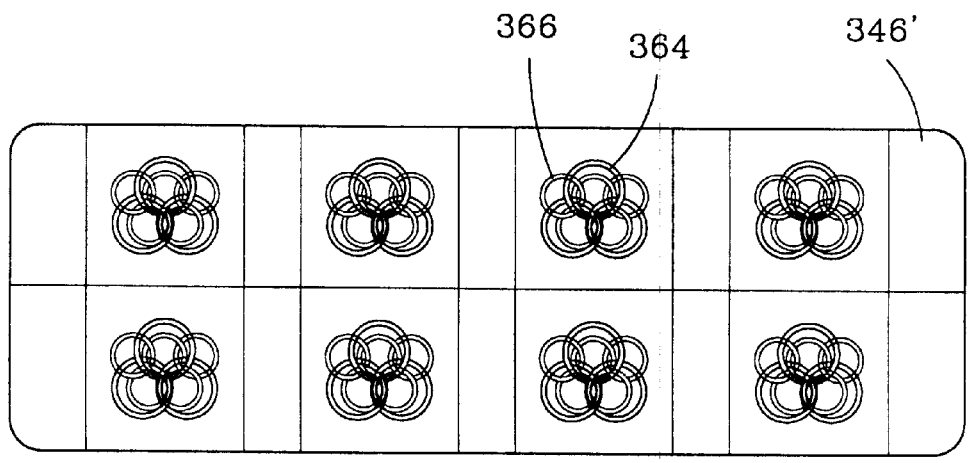
FIG. 23 is a top plan view showing both a 3-D image and a printed pattern displayed on the multi-layer packaging foil in accordance with the fourth embodiment of the present invention.

Further, in accordance with a fourth embodiment of the present invention, a plastic film may be added to the bottom side of the bottom structure 310 (or the lower half sheet 326) of the multi-layer packaging foil 346, such as adding a layer of PET material 362 to the PET bottom structure 310, see FIG. 22. In accordance with the present invention, patterns or marks 364 may be printed on an inner side of the plastic layer 362 which is the side that is to engage the bottom structure 310. Thus, by fixing the pattern printed layer or film 362 to the bottom side of the bottom structure 310 of the multi-layer packaging foil 346, as shown in FIG. 23, when the packaging foil in accordance with the fourth embodiment is viewed from the outside, both the printed pattern 364 and a 3-D image 366 may be observed by an observer. For distinction from the third embodiment, the multi-layer packaging foil that comprises the pattern printed layer 362 as shown in FIG. 23 is designated with reference numeral 346'.

Figure 24:
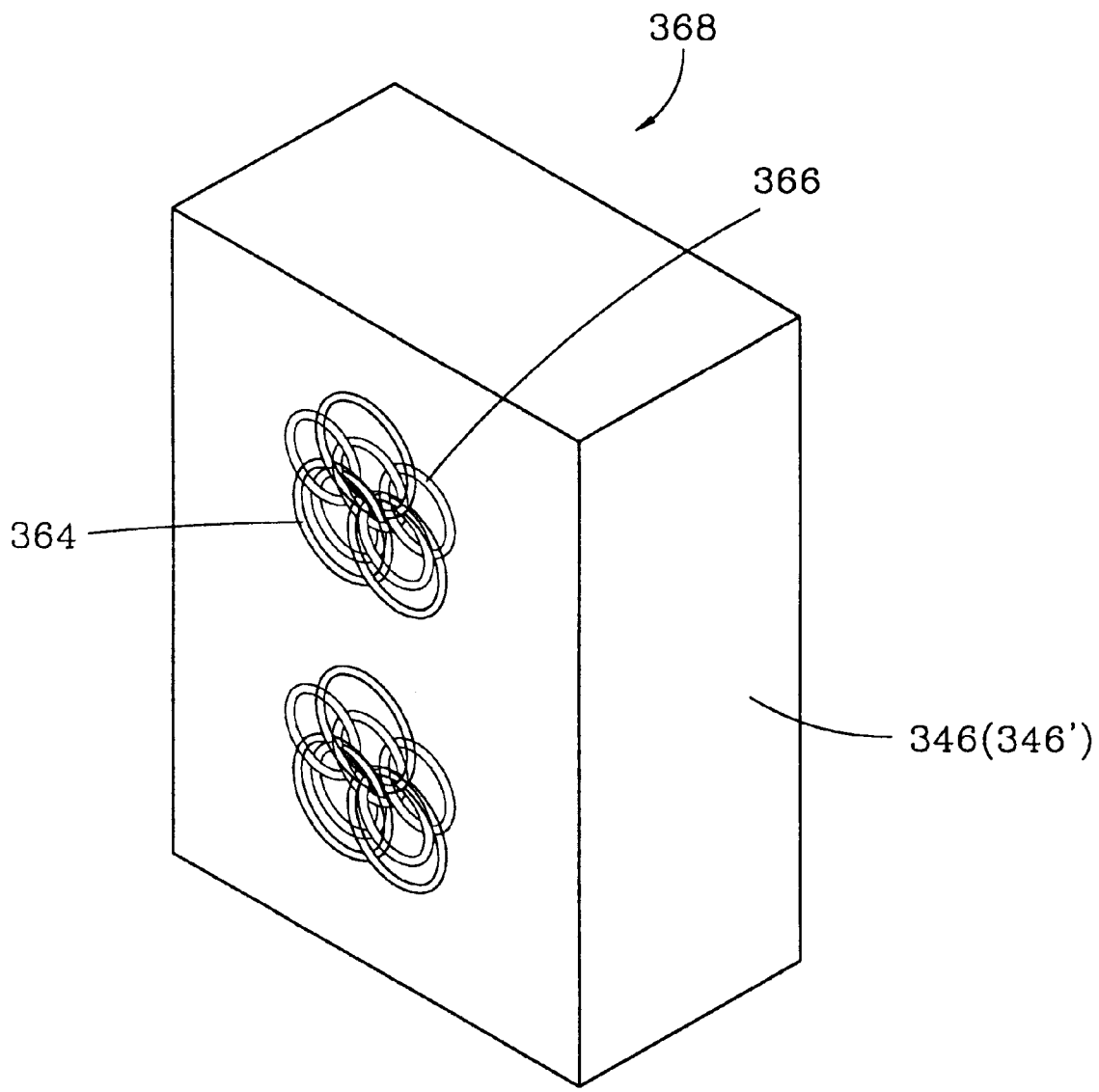
FIG. 24 is a side elevational view showing the multi-layer packaging foil in accordance with the third or the fourth embodiment is used to pack a product.

The multi-layer packaging foil 346 or 346' constructed in accordance with the third or fourth embodiment of the present invention may be used to pack liquid food, such as juice, by having the surface layer 330 of the top structure 312 made of polyethylene (PE) film with the PE film in contact with the liquid food, as shown in FIG. 24 in which a liquid food packaging container is shown, designated with reference numeral 368 having both 3-D holographic image 366 and printed pattern 364 appearing thereon.

Figure 25:
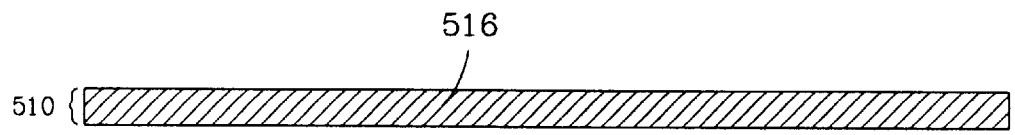
FIG. 25 is a cross-sectional view showing a bottom structure of a multi-layer packaging foil in accordance with a fifth embodiment of the present invention.
Figure 26:
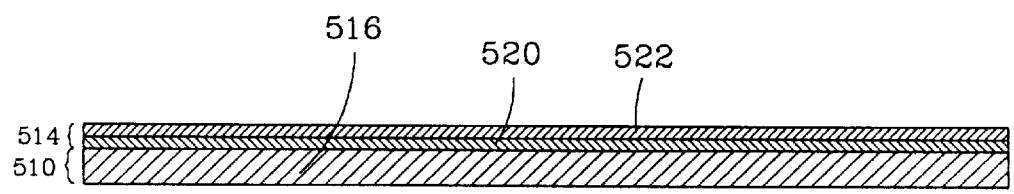
FIG. 26 is a cross-sectional view showing the bottom structure of the multi-layer packaging foil of the fifth embodiment with a hologram membrane which has not yet formed with hologram serration mounted thereon.
Figure 27:
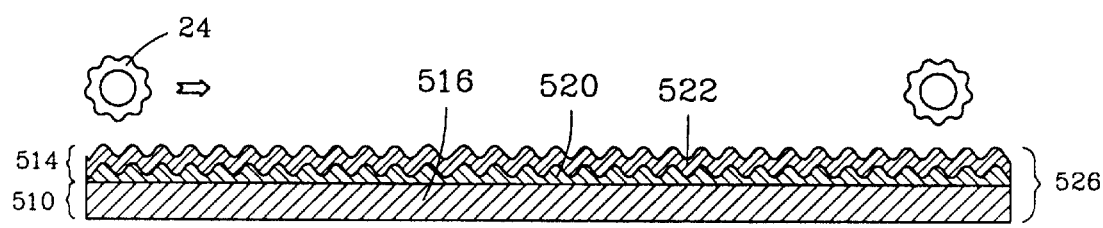
FIG. 27 is a cross-sectional view showing the bottom structure of the multi-layer packaging foil of the fifth embodiment with the hologram serration formed on the hologram membrane.
Figure 28:
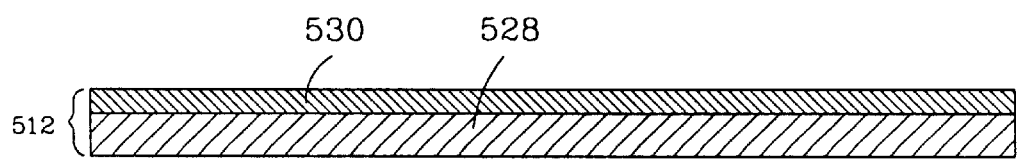
FIG. 28 is a cross-sectional view showing a top structure of the multi-layer packaging foil of the fifth embodiment of the present invention.

Also, in accordance with a fifth embodiment of the present invention, as shown in FIGS. 25–28 wherein the hologram membrane is formed in the same way as the first embodiment illustrated in FIGS. 1–11 with the primer layer and the aluminum reflective layer formed first and then forming the hologram serration by having the serration forming roller rolling over on the aluminum reflective layer, a multi-layer packaging foil comprises a bottom structure 510 which is comprised of a plastic base layer 516 only, see FIG. 25, with no release layer coated thereon. The base layer 516 may be made of for example PET or PVC. A layer of resin 520 is then added on the base layer 516 to serve as a primer layer of a hologram membrane 514 with a thin aluminum layer 522 (serving as an aluminum reflective layer of the hologram membrane) further added on the resin layer 520, see FIG. 26. The primer layer 520 and the aluminum reflective layer 522, in combination, form the hologram membrane 514 of the fifth embodiment of the present invention. Thereafter, a serration forming roller 24 is rolled over on the aluminum layer 522, see FIG. 27, to form a desired serration that defines a desired hologram. The serrated hologram membrane 514 and the bottom structure 510 together define a lower half sheet 526 of the fifth embodiment. As shown in FIG. 28, a top structure or upper half sheet 512 is formed by adding an adhesion layer (surface layer) 530 on an aluminum foil 528. Similar to the previous embodiments, the upper half sheet 512 and the lower half sheet 526 may be fixed to each other by using the arrangement and means illustrated in FIG. 5 together with application of the two component adhesive therebetween. If needed, a pattern printed layer (not shown) on which patterns or marks are printed may be added to the bottom side of the bottom structure 510.

Figure 29A:
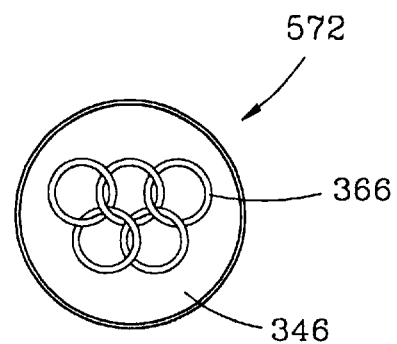
FIG. 29A is a top plan view taken along line 29A—29A.
Figure 29:
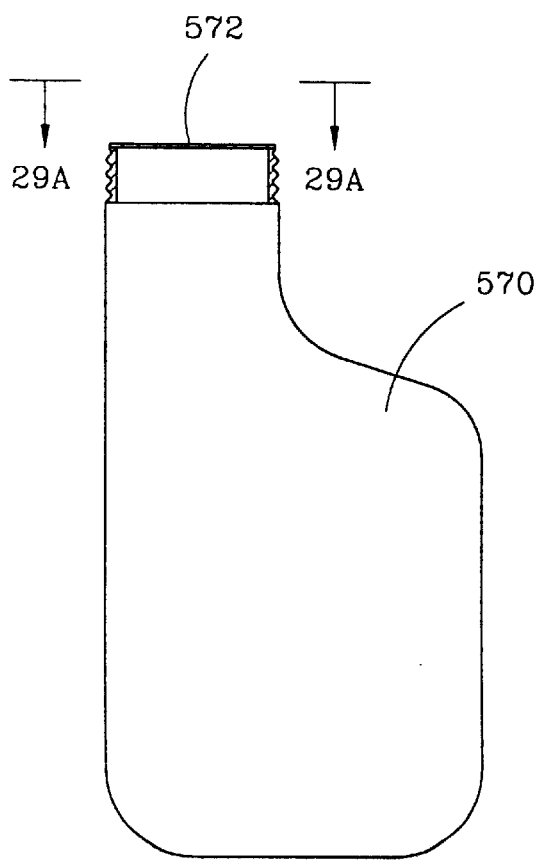
FIG. 29 shows the multi-layer packaging foil of the third or the fifth embodiment used to seal an oil container opening.
Figure 30A:
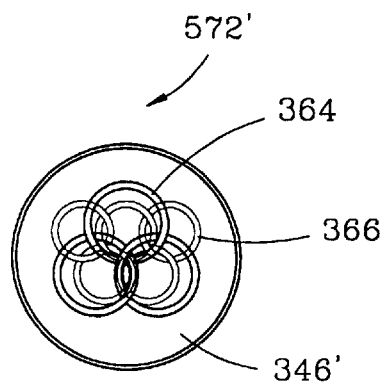
FIG. 30A is a top plan view taken along line 30A—30A to show the 3-D image and the printed pattern.
Figure 30:
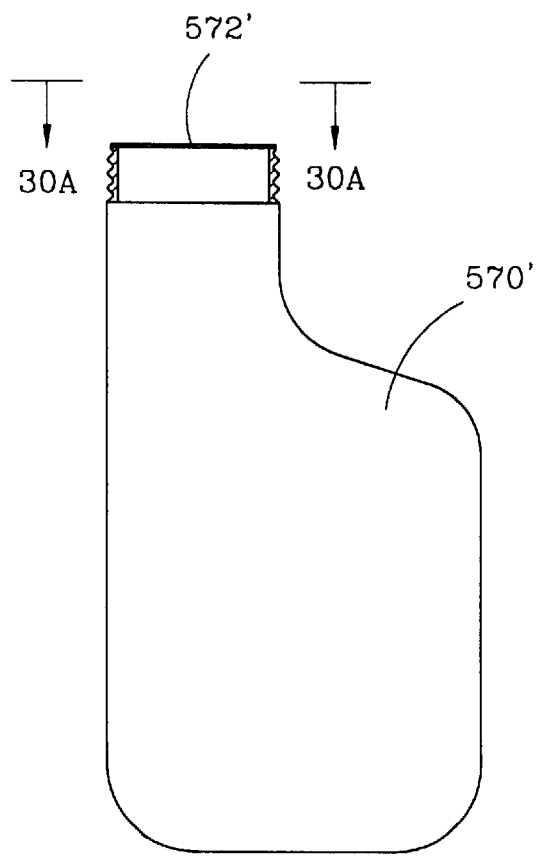
FIG. 30 shows the multi-layer packaging foil of the fourth embodiment used to seal an oil container opening.

FIG. 29 illustrates an application of the multi-layer packaging foil in accordance with the third, fourth and fifth embodiments to serve as a sealing tab 572 of a plastic oil container 570. The sealing tab 572 is made of the multi-layer packaging foil which may be the packaging foil 346 of the third embodiment or the packaging foil of the fifth embodiment. FIG. 29A shows a top plan view of the sealing tab 572 wherein a 3-D image, designated at 366, formed by the hologram serration is shown. FIG. 30 shows a similar application, but the oil container 570' has a sealing tab 572' made of the multi-layer packaging foil of the fourth embodiment of the present invention which when viewed from the outside displays both the 3-D image 366 formed by the hologram serration and the printed pattern 364 that is printed on the inner side of the pattern printed layer, as shown in FIG. 30A. In the applications shown in FIGS. 29 and 30, the adhesion layer 330 of the top structure 312 of the multi-layer packaging foil 346 or 346' is made of PE film which is heat bonded to the opening of the oil container.

It is apparent that although the present invention is illustrated with the description of the preferred embodiments thereof, it is contemplated that there may be changes and modifications in the described embodiments that can be carried out without departing from the scope of the invention which is intended to be limited only by the appended claims.

What is claimed is:

1. A method for manufacturing a multi-layer packaging foil having a hologram layer, said method comprising the following steps:

(1) providing a bottom structure, comprising a base layer made of a base material, having a bottom side providing a first outside surface;

(2) providing a hologram membrane on the bottom structure to be opposite to the bottom side thereof so as to form a first sheet, the hologram membrane comprising a primer layer and a reflective layer with a serration defining a hologram formed thereon;

(3) providing a top structure, comprising an aluminum foil and a surface layer to define a second sheet; and (4) fixing the top structure to the hologram membrane by applying adhesive therebetween to cause the aluminum foil of the top structure to be adhered to the reflective layer of the hologram membrane so that the surface layer of the top structure defines a second outside surface opposite to the first outside surface with a 3-D image defined by the hologram serration appearing on the first outside surface.

2. The method as claimed in claim 1, wherein the bottom structure comprises a resin based release layer coated on the base layer to be opposite to the bottom side of the bottom structure for mounting to the hologram membrane.

3. The method as claimed in claim 2, further comprising the follow step after step 4:

(5) peeling the bottom structure from the multi-layer packaging foil along the release layer.

4. The method as claimed in claim 1, wherein step (2) comprises the follow steps:

(2a) attaching the primer layer of the hologram membrane to the bottom structure;

(2b) attaching the reflective layer to the prime layer; and (2c) providing a serration forming roller on which a pattern defining a serration complementary to the hologram serration is formed and rolling the serration forming roller over on the reflective layer to form the hologram serration.

5. The method as claimed in claim 1, wherein step (2) comprises the follow steps:

(2a) attaching the primer layer of the hologram membrane to the bottom structure;

(2b) providing a serration forming roller on which a pattern defining a serration complementary to the hologram serration is formed and rolling the serration forming roller over on the primer layer to form the hologram serration on the primer layer; and (2c) coating the reflective layer to the serrated prime layer.

6. The method as claimed in claim 5, wherein the reflective layer comprises an aluminum layer formed by electroplating or vacuum deposition.

7. The method as claimed in claim 1, wherein the adhesive applied between the top structure and the hologram membrane is a two component adhesive and wherein step (4) comprises the following steps:

(4a) applying the adhesive to one of the first sheet and the second sheet; and (4b) bringing the first and second sheets into contact engagement with each other to have the first and second sheets secured to each other by means of the adhesive.

8. The method as claimed in claim 7, wherein step (4b) further comprises the step of passing the first and second sheets through a pair of rollers, thereby securely compressing the first and second sheets to each other by means of the adhesive.

9. The method as claimed in claim 1, wherein the surface layer of the top structure is made of a pressure sensitive adhesive material.

10. The method as claimed in claim 1, wherein the surface layer of the top structure is made of a heat sensitive adhesive material.

11. The method as claimed in claim 10, wherein the heat sensitive adhesive material comprises polyethylene.

12. The method as claimed in claim 1, further comprising the following steps:

(5) providing a layer of material having an inner surface facing the bottom side of the bottom structure on which patterns are printed; and (6) attaching the inner surface of the layer having patterns printed thereon to the bottom side of the bottom structure.

13. The method as claimed in claim 1, wherein the base layer of the bottom structure is made of polyvinyl chloride.

14. The method as claimed in claim 1, wherein the base layer of the bottom structure is made of polyethylene terephthalate.

* * * * *